United States Patent
Niculescu-Mizil et al.

(10) Patent No.: US 11,763,198 B2
(45) Date of Patent: Sep. 19, 2023

(54) SENSOR CONTRIBUTION RANKING

(71) Applicant: NEC Laboratories America, Inc., Princeton, NJ (US)

(72) Inventors: Alexandru Niculescu-Mizil, Plainsboro, NJ (US); Shuchu Han, Princeton Junction, NJ (US)

(73) Assignee: NEC Corporation

( * ) Notice: Subject to any disclaimer, the term of this patent is extended or adjusted under 35 U.S.C. 154(b) by 521 days.

(21) Appl. No.: 17/064,058

(22) Filed: Oct. 6, 2020

(65) Prior Publication Data

US 2021/0103768 A1  Apr. 8, 2021

Related U.S. Application Data

(60) Provisional application No. 62/912,129, filed on Oct. 8, 2019.

(51) Int. Cl.

| | |
|---|---|
| *G06N 20/00* | (2019.01) |
| *G06N 3/02* | (2006.01) |
| *G06F 9/4401* | (2018.01) |
| *G06F 18/2323* | (2023.01) |
| *G06F 18/214* | (2023.01) |
| *G06F 18/2413* | (2023.01) |
| *G06N 7/01* | (2023.01) |

(52) U.S. Cl.
CPC .......... *G06N 20/00* (2019.01); *G06F 9/4401* (2013.01); *G06F 18/2155* (2023.01); *G06F 18/2323* (2023.01); *G06F 18/24147* (2023.01); *G06N 7/01* (2023.01)

(58) Field of Classification Search
None
See application file for complete search history.

(56) References Cited

U.S. PATENT DOCUMENTS

| | | | |
|---|---|---|---|
| 8,838,508 B2 | 9/2014 | Niculescu-Mizil et al. | |
| 2016/0148103 A1* | 5/2016 | Sarrafzadeh ........... | G06N 20/00 706/46 |

(Continued)

FOREIGN PATENT DOCUMENTS

| | | | | |
|---|---|---|---|---|
| CN | 110654339 A | * | 1/2020 | ......... B60R 21/0136 |
| WO | WO-2016116880 A1 | * | 7/2016 | ............... H04B 1/00 |
| WO | WO-2019018533 A1 | * | 1/2019 | |

OTHER PUBLICATIONS

Cai et al., "Unsupervised Feature Selection for Multi-Cluster Data", Proceedings of the 16th ACM SIGKDD International conference on Knowledge discovery and data mining. Jul. 25-28, 2010. pp. 333-342.

(Continued)

*Primary Examiner* — Mohammed Rachedine
(74) *Attorney, Agent, or Firm* — Joseph Kolodka

(57) ABSTRACT

Methods and systems for detecting and correcting anomalies include detecting an anomaly in a cyber-physical system, based on a classification of time series information from sensors that monitor the cyber-physical system as being anomalous. A similarity graph is determined for each of the sensors, based on the time series information. A subset of the sensors that are related to the classification is selected, based on a spectral embedding of the similarity graphs. A corrective action is performed responsive to the detected anomaly, prioritized according to the selected subset.

20 Claims, 4 Drawing Sheets

(56) References Cited

U.S. PATENT DOCUMENTS

| | | | | |
|---|---|---|---|---|
| 2018/0165147 A1* | 6/2018 | Debnath | ............. | G06F 11/0766 |
| 2018/0181749 A1* | 6/2018 | Kolacinski | ............... | G06N 7/01 |
| 2019/0041235 A1* | 2/2019 | Ko | ........................... | G01D 5/00 |
| 2020/0336499 A1* | 10/2020 | Kulkarni | ................. | G06F 18/29 |

OTHER PUBLICATIONS

Cortes et al., "Two-Stage Learning Kernel Algorithms", Proceedings of the 27th International Conference on Machine Learning. Jun. 21-24, 2010. pp. 1-10.

Cristianini et al., "On Kernel-Target Alignment", Advances in neural information processing systems. Dec. 3-8, 2001. pp. 1-7.

Kumar et al. "A Binary Classification Framework for Two-Stage Multiple Kernel Learning", Proceedings of the 29th International Conference on Machine Learning Jun. 26-Jul. 1, 2012. pp. 1-8.

Yang et al., "A supervised feature subset selection technique for multivariate time series", Proceedings of the workshop on feature selection for data mining: Interfacing machine learning with statistics. Apr. 23, 2005. pp. 92-101.

Yoon et al., "Feature Subset Selection and Feature Ranking for Multivariate Time Series", IEEE Transactions on Knowledge and Data Engineering, vol. 17, No. 9. Sep. 2005. pp. 1-13.

\* cited by examiner

SENSOR CONTRIBUTION RANKING

RELATED APPLICATION INFORMATION

This application claims priority to U.S. Application Ser. No. 62/912,129, filed on Oct. 8, 2019, incorporated herein by reference entirety.

BACKGROUND

Technical Field

The present invention relates to analysis of multivariate time series, and, more particularly, to identifying sensors that contribute to a classification of a multivariate time series.

Description of the Related Art

Complex systems, such as in modern manufacturing industries, power plants, and information services, are difficult to monitor due to the large number of sensors that may be installed, each generating respective time series information. For example, temperature and pressure sensors may be distributed throughout a power plant. It is challenging to identify anomalous behavior across such complex systems, and it can be even more challenging to identify which particular sensors are the source of an anomalous reading.

SUMMARY

A method for detecting and correcting anomalies includes detecting an anomaly in a cyber-physical system, based on a classification of time series information from sensors that monitor the cyber-physical system as being anomalous. A similarity graph is determined for each of the sensors, based on the time series information. A subset of the sensors that are related to the classification is selected, based on a spectral embedding of the similarity graphs. A corrective action is performed responsive to the detected anomaly, prioritized according to the selected subset.

A system for detecting and correcting anomalies includes a hardware processor and a memory. The memory is configured to store a computer program that, when executed by the hardware processor, implements anomaly detection code, sensor selection code, and a controller. The anomaly detection code detects an anomaly in a cyber-physical system, based on a classification of time series information from a plurality of sensors that monitor the cyber-physical system as being anomalous. The sensor selection code determines a similarity graph for each of the plurality of sensors, based on the time series information and selects a subset of the plurality of sensors that are related to the classification, based on a spectral embedding of the similarity graphs. The controller performs a corrective action responsive to the detected anomaly, prioritized according to the selected subset.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide automatic detection, diagnosis, and correction of anomalous behavior in a complex system. When identifying the specific sensors that are important to the classification of a multivariate time series as anomalous, the distance between time series can be used to avoid feature extraction. Toward this end, a filter model can be used to select features, based on the spectral embedding of each sensor's similarity graph. A wrapper model can select the optimal subset of sensors for the classification outcome.

A similarity graph can be constructed for each sensor, across different multivariate time series. A label graph describes the group relationship of different labels. The cluster structural information of each sensor's similarity graph can be represented as an embedded vector. Sensor ranking can then be performed by comparing the similarity between the embedding vector and labels, with sensor subset selection being performed by minimizing the approximation error between a linear combination of selected sensor graphs and the similarity of graph labels.

Thus, features of the multivariate time series can be extracted, without extracting features for each sensor's output. Sensor ranking, using the filter model, can use graph spectral embedding to represent the cluster structure of a graph. Sensor subset selection, using the wrapper model, limits the redundancy of the subset using the graph-based process described herein, with a constraint.

Figure 1:
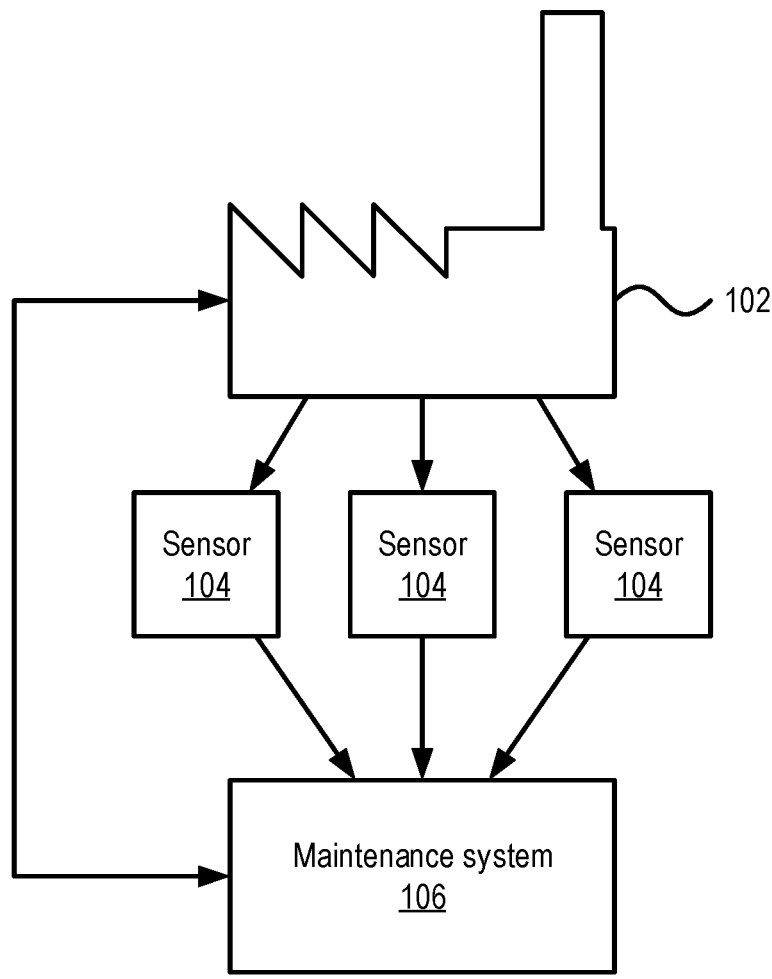
FIG. 1 is a diagram of a system for monitoring and maintaining a cyber-physical system using a set of sensors, where sensors related to a determination of abnormal behavior are selected to prioritize a response, in accordance with an embodiment of the present invention.

Referring now in detail to the figures in which like numerals represent the same or similar elements and initially to FIG. 1, a maintenance system 106 in the context of a monitored system 102 is shown. The monitored system 102 can be any appropriate system, including physical systems such as manufacturing lines and physical plant operations, electronic systems such as computers or other computerized devices, software systems such as operating systems and applications, and cyber-physical systems that combine physical systems with electronic systems and/or software systems.

One or more sensors 104 record information about the state of the monitored system 102. The sensors 104 can be any appropriate type of sensor including, for example, physical sensors, such as temperature, humidity, vibration, pressure, voltage, current, magnetic field, electrical field, and light sensors, and software sensors, such as logging utilities installed on a computer system to record information regarding the state and behavior of the operating system and applications running on the computer system. The information generated by the sensors 104 can be in any appropriate format and can include sensor log information generated with heterogeneous formats.

In particular embodiments, the sensor data 104 can also include a KPI measurement. In some embodiments, the KPI measurement may be the result of an inspection of a physical output of the monitored system 102, or can represent a determination of a quality of the physical output by any appropriate measurement or characteristic.

The sensors 104 may transmit the logged sensor information to an anomaly maintenance system 106 by any appropriate communications medium and protocol, including wireless and wired communications. The maintenance system 106 can, for example, identify abnormal behavior by monitoring the multivariate time series that are generated by the sensors 104. Once anomalous behavior has been detected, the maintenance system 106 communicates with a system control unit to alter one or more parameters of the monitored system 102 to correct the anomalous behavior. Exemplary corrective actions include changing a security setting for an application or hardware component, changing an operational parameter of an application or hardware component (for example, an operating speed), halting and/or restarting an application, halting and/or rebooting a hardware component, changing an environmental condition, changing a network interface's status or settings, etc. The maintenance system 106 thereby automatically corrects or mitigates the anomalous behavior. By identifying the particular sensors 104 that are associated with the anomalous classification, the amount of time needed to isolate a problem can be decreased.

Figure 2:
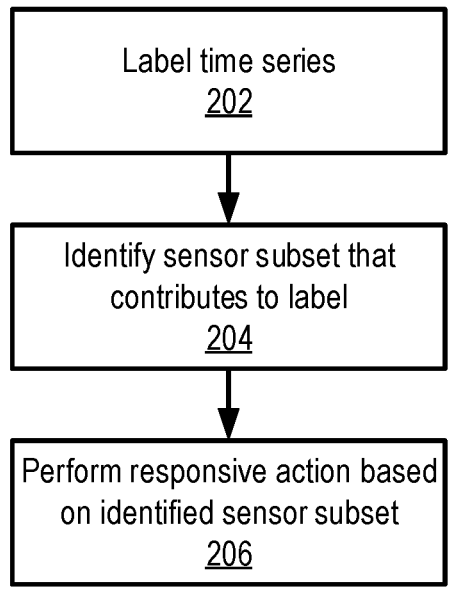
FIG. 2 is a block/flow diagram of a method of identifying and responding to behavior in a monitored system, based on a classification of the behavior, in accordance with an embodiment of the present invention.

Referring now to FIG. 2, a method for identifying and responding to anomalous activity in a monitored system 102 is shown. Block 202 labels a multivariate time series. It is specifically contemplated that the label may identify the time series as being "normal" or "anomalous," but it should be understood that any appropriate label may be used instead. Any process for selecting the label may be used, such as manual labeling or by a trained machine learning classifier. It is specifically contemplated that the labeling of block 202 may be performed using a neural network classifier, for example one that identifies patterns in multivariate time series inputs, and associates those patterns with anomalous activity.

Once a label has been generated, for example identifying anomalous activity within the monitored system 102, block 204 identifies a subset of sensors that contributes most to the classification. Additional detail on how this subset may be selected is described below. Notably, the identification of the relevant sensor subset need not be based on the operation of the classifier. Instead, the sensor subset identification may be based on the content of the multivariate time series itself. Once the sensor subset is identified, block 206 performs a responsive action based on the selection, for example prioritizing the selected sensors.

Figure 3:
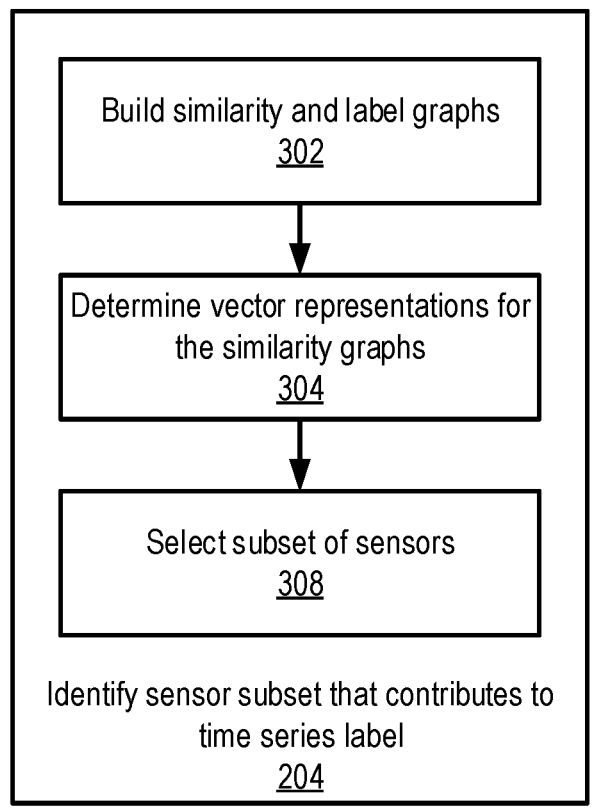
FIG. 3 is a block/flow diagram of a method of identifying a sensor subset that contributes to a classification label, using similarity graphs for each of the sensors, in accordance with an embodiment of the present invention.

Referring now to FIG. 3, additional detail on the identification of a sensor subset, which contributes to the label determined in block 204, is shown. Block 302 builds a similarity graph for each sensor 104 in a given multivariate time series. The multivariate time series may be input as a set of time segment pairs, $\{(X_1, y_1), \ldots, (X_i, y_i), \ldots, (X_n, y_n)\}$, where $X_i$ is a multivariate time series segment and $y_i$ is a corresponding label. Each time series segment includes a set of m sensor outputs over a corresponding time period. Each label may be a discrete label value, for example a numerical value, an alphanumerical value, a string of characters, or any other appropriate value. In one particular example, the labels may include a designation for "normal" behavior, and a designation for "anomalous" behavior.

Block 302 thus may build a set of similarity graphs $G_{t_k}^x$, with $t_k$ identifying a corresponding sensor, and with x denoting that it is a similarity graph. Block 302 may also build a set of label graphs $G^y$, with y denoting that it is a label graph.

For the label graph, an initial graph $G^y$ may be defined with n nodes. For each node pair (i,j), block 302 creates an edge in the label graph if, and only if, $y_i$ equals $y_j$, such that the two nodes have the same label. The edge weight may be set to any appropriate value, with '1' being specifically contemplated as a weight for all edges. Thus, the label graph $G^y$ connects time segments together that have the same labels.

For the similarity graph, block 302 may construct m such graphs, one for each sensor 104 in the multivariate time series. An initial graph $G_i^x$ may be defined for each sensor 104, denoted as $t_k$. Each respective similarity graph may have n nodes, corresponding to the n time segments at which the respective sensor 104 was measured. For each pair of nodes (i,j) in the similarity graph, block 302 calculates a distance $W_{t_k}(i,j)$ between the measurements of sensor $t_k$ in the corresponding time segments, $X_i$ and $X_j$. This distance may be calculated according to a dynamic time warping distance between the two time segments, $X_i$ and $X_j$. Thus, $W_{t_k}(i,j)=DTW(X_i(t_k),X_j(t_k))$. It should be noted that, while the dynamic time warping distance is particularly appropriate for real-valued time series data, the use of non-real valued data is also contemplated, and may be implemented with any appropriate distance metric, such as the Levenshtein distance for string representations.

Once the distance matrix is calculated for all pairs, the similarity graph can be determined by building a k-nearest neighbor graph W' by setting k (for the k-nearest neighbors) equal to an appropriate value and performing a transposition to enforce symmetry, according to, e.g.:

$$G_k^x(i,j)=0.5(W'+\text{transpose}(W'))$$

The k-nearest neighbor graph may be used to preserve the geometry structure of the original data's distribution. This may generate an undirected similarity graph, defined by the symmetric adjacency matrix. The diagonal may then be set to zero. The output of block 302 may thus include a set of matrices $\{G_1, G_2, \ldots, G_m, G_y\}$, with $G_1, G_2, \ldots, G_m$ representing the m similarity graphs, and with $G_y$ representing a similarity graph for the labels of the time segments. The value of k may be set to any appropriate number.

Block 304 may form vector representations of the similarity graphs, for example using spectral embedding vectors that cluster structure information of the similarity graphs. Power iteration embedding may be used, though other approaches, such as a top-k spectral clustering embedding and heat kernel embedding may be used instead.

The embedding vector may be an early stopping approximation of the largest eigenvector of a normalized similarity graph G, which may equal $D^{-1}G$, where D is a degree matrix of G. The power iteration embedding vector may be determined as:

$$v^t = cD^{-1}Gv^{t-1}$$

where c is a normalizing constant that limits the value of v, and may be set to $c = \|D^{-1}Gv^{t-1}\|_1^{-1}$. The power iteration embedding may approximate the cluster structure of the graph by using a one-dimensional vector.

In particular, to determine an embedding vector $v^t$, an initial vector $v^0$ is initialized. At each iteration, the following operations may be performed:

$$v^{t+1} \leftarrow \frac{Wv^t}{\|Wv^t\|_1}$$

$$\delta^{t+1} \leftarrow |v^{t+1} - v^t|$$

$$t \leftarrow t+1$$

These iterations may be performed until $\|\delta^t - \delta^{t+1}\|_{max} \cong 0$, and the final vector $v^t$ may be output. $\delta$ is the change in the vector from one iteration to the next. The threshold for determining when the difference between successive $\delta$ values is sufficiently small can be any appropriate value. The vector $v^t$ is the spectral embedding of the corresponding similarity graph.

Block 308 selects a subset of the m sensors 104. Any appropriate selection process can be used to select the sensors, as will be described in greater detail below.

Figure 4:
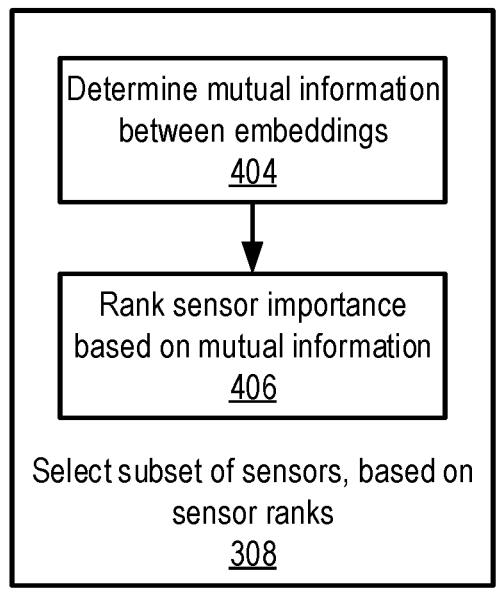
FIG. 4 is a block/flow diagram of a method of selecting sensors for the sensor subset, based on sensor ranking scores, in accordance with an embodiment of the present invention.

Referring now to FIG. 4, additional detail on a way to implement the selection of sensors in block 308, based on sensor ranks, is shown. Block 404 first calculates a score for each of the spectral embedding vectors. Score may include a calculation of a normalized mutual information between the spectral embedding vector and the ground truth label vector y. The score may be calculated as:

$$r(v^t) = \text{score}(v^t, y) = \frac{I(v^t, y)}{\sqrt{H(v^t)H(y)}}$$

where $I(\cdot,\cdot)$ denotes a mutual information function and where $H(\cdot)$ denotes an entropy function, such as $H(v^t) = \Sigma_i p(y_i) \log(p(y_i)) \forall y_i \in v^t$. A k-means clustering may be used to put the real values of $v^t$ into different bins. The number of bins may equal the number of different labels in y. Higher ranking score values reflect greater proximity of the spectral embedding vector to the label's distribution. Block 406 may then generate a top rank with multiple sensors 104 that are highly correlated with one another. Selecting sensors by score is an efficient approach, but does not necessarily make use of the redundancy between sensors.

Figure 5:
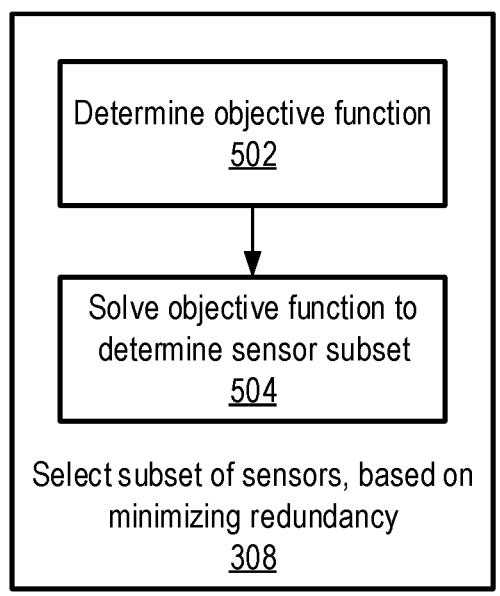
FIG. 5 is a block/flow diagram of a method of selecting sensors for the sensor subset, based on minimizing sensor redundancy, in accordance with an embodiment of the present invention.

Referring now to FIG. 5, additional detail on a way to implement the selection of sensors in block 308, based on minimizing redundancy, is shown. In particular, block 308 selecting sensors with less redundancy may help a user identify the importance of different features. For example, redundancy may be measured by a normalized mutual information score between the spectral embedding vectors of the sensors 104.

Block 502 determines an objective function to characterize the redundancy. The following objective function may be used to calculate a sensor subset with low redundancy:

$$\min_\alpha \frac{1}{2}\left\|W_y - \sum_{i=1}^m \alpha_i W_i\right\|_F^2 + \lambda \sum_{i=1}^m |\alpha_i| + \beta \sum_{i,j} \alpha_i \alpha_j I(v_i^t, v_j^t), \text{ s.t. } \alpha_i \geq 0$$

where $\lambda \geq 0$ and $\beta \geq 0$ may be user-specified Lasso penalty and redundancy control parameters. The first term of the function represents the approximation of the label graph by a linear combination of sensor graphs, with $\alpha_i$ being a weight for each sensor to be inferred by the optimization problem. The second term of the function applies a sparsity constraint to the coefficients of the linear combination. The third term of the function applies a redundancy constraint to the selection of the sensor graph in the final subset.

Written in matrix form, the objective function can be expressed as:

$$\min_\alpha \frac{1}{2}\|W_y - W\alpha\|_F^2 + \lambda\|\alpha\|_1 + \beta \alpha^T G_I \alpha$$

This objective function is non-convex, as the matrix $G_I$ is not positive semi-definite. The diagonal elements of $G_I$ also lets the objective function penalize the self-redundancy terms $G_I(i,i)$ and to create selection bias in favor of sensor graph embedding vectors that have lower entropy.

The matrix Q may be defined as:

$$Q_{ij} = \begin{cases} I(v_i^t, y) & \text{if } i = j \\ 1/2(I(v_i^t; y | v_j^t) + I(v_j^t; y | v_i^t)) & \text{if } i \neq j \end{cases}$$

This may be used to re-express the objective function as:

$$\mathcal{J}(\alpha) = \frac{1}{2}\|W_y - W\alpha\|_F^2 + \lambda\|\alpha\|_1 + \beta \alpha^T (Q + \gamma I)\alpha$$

where I is the identity matrix and $\gamma$ is a user-defined parameter.

The calculation of the mutual information can be computationally intensive, particularly if the number of sensors is large. To solve this scaling challenge, a Nystrom matrix approximation can be used, with an approximate matrix $\tilde{Q}$ being expressed as:

$$\tilde{Q} = \begin{bmatrix} A & B \\ B^T & B^T A^{-1} B \end{bmatrix}$$

where A and B are sub-matrices used for the approximation. This approximation can be pre-processed by adjusting the value of $\gamma$.

Block 504 then solves the objective function, for example using a coordinate descent. For a large dataset, with many sensors 104, a stochastic coordinate descent can be used, to improve scalability, as follows. Each matrix W can be expressed as a vector representation x, with the objective function being re-expressed as:

$$\mathcal{J}(\alpha) = \frac{1}{2}\|x_y - X\alpha\|_F^2 + \lambda\|\alpha\|_1 + \beta \alpha^T (Q + \gamma I)\alpha$$

where X is a matrix having dimension $n^2 \times m$ and where each column $X_j$ of X is a vector representation of $W_j$.

The objective function can then be split into parts:

$$\mathcal{J}(\alpha) = f(\alpha) + g(\alpha)$$

$$f(\alpha) = \frac{1}{2}\|x_y - X\alpha\|_2^2 + \beta \alpha^T \tilde{Q}\alpha$$

$$g(\alpha) = \lambda\|\alpha\|_1$$

Each term can be separated into a part $\alpha_k$ and a part $\alpha_{-k}$, where $-k$ denotes the set that does not include the $k^{th}$ item. The function $f$ can then be expressed as:

$$f(\alpha) = \frac{1}{2\|x_y - X_{:,-k}\alpha_{-k} - X_{:,k}\alpha_k\|_2^2} +$$

$$\beta\alpha_{-k}\hat{Q}_{-k,-k}\alpha_{-k} + \beta\alpha_{-k}\left(\sum_j \hat{Q}_{k,j}\alpha_j\right) + \beta\left(\sum_i \alpha_i \hat{Q}_{ik}\right)\alpha_k$$

The derivative of $f$ over one coordinate $\alpha_k$ is:

$$\frac{\partial f}{\partial \alpha_k} = -X_k^T X\alpha - X_k^T x_y + 2\beta\alpha^T \hat{Q}_{:,k}.$$

The component-wise proximal operator of $g(\alpha_i)$ is the $\ell_1$ norm:

$$Prox_{\lambda\|\cdot\|_1}(\alpha_i) = \operatorname*{argmin}_{\hat{\alpha}} \frac{1}{2\|\hat{\alpha}_i - \alpha_i\|_2^2} + \lambda\|\hat{\alpha}\|_1$$

and where the solution is:

$$\hat{\alpha}_i^{lasso} = \operatorname{sign}(\hat{\alpha}_i)\max(|\hat{\alpha}_i| - \lambda, 0)$$

For a large dataset, with many sensors 104, a stochastic coordinate descent can be used to improve scalability. The result of block 504 is a set of sensors with low redundancy.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 6:
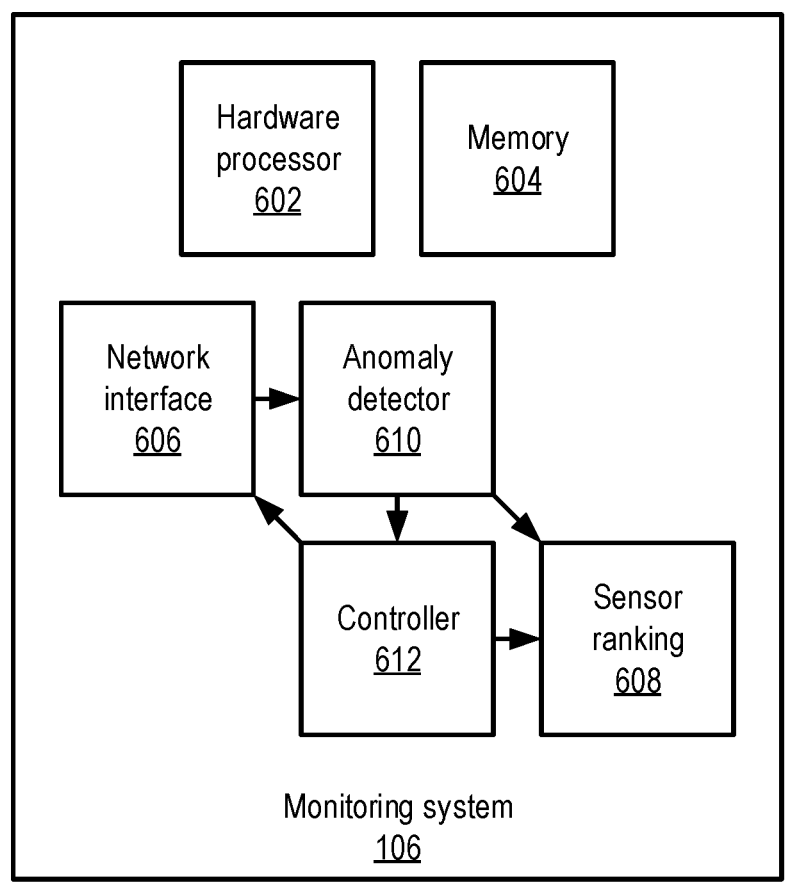
FIG. 6 is a block diagram of a monitoring system for a cyber-physical system, which may identify anomalous behavior and may identify particular sensors from the cyber-physical system for a response, in accordance with an embodiment of the present invention.

Referring now to FIG. 6, additional detail regarding the monitoring system 106 is shown. The system 106 includes a hardware processor 602 and a memory 604. A network interface 606 communicates with one or more sensors 104 in a monitored system 102, and may also provide the ability to send instructions the monitored system, for example to control one or more operational parameters. The network interface 606 may communicate with the sensors 104 and the monitored system 102 by any appropriate wired or wireless communications medium and using any appropriate protocol.

Anomaly detector 610 may assess the multivariate time series generated by the sensors 104, and may classify segments of the time series according to whether they are, e.g., normal or abnormal. A controller 612 automatically responds to the flagged anomalies by triggering a corrective action using the network interface 606. The corrective action can include diagnostics designed to acquire more information regarding the anomaly from the sensors 104. The corrective action can include sending an instruction to one or more sub-systems of the monitored system 102, to bring the sensor readings back to a "normal" state.

Sensor selection 608 may be used to determine which of the sensors 104 to respond to, thereby prioritizing the automatic response. As noted above, there are multiple approaches that may be taken to selecting the subset of sensors. For example, the sensors 104 can be polled in ranked order to obtain diagnostic information. Sensors may be selected according to their redundancy, to reduce the amount of work needed to identify an underlying cause of the abnormal behavior.

In other embodiments, corrective actions can include changing a setting or state of devices associated with the respective sensors 104. The sensor ranking 608 may be determined by the processor 602 and may be stored in the memory 604. The sensor ranking 608 identifies particular sensors 104 according to similarity graphs for each sensor 104 in a given time segment.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting and correcting anomalies, comprising:
    detecting an anomaly in a cyber-physical system, based on a classification of time series information from a plurality of sensors that monitor the cyber-physical system as being anomalous;
    determining a similarity graph for each of the plurality of sensors, based on the time series information;
    selecting a subset of the plurality of sensors that are related to the classification, based on a spectral embedding of the similarity graphs; and
    performing a corrective action responsive to the detected anomaly, prioritized according to the selected subset.

2. The method of claim 1, wherein each similarity graph includes a set of nodes that represent measurements from a respective sensor at different time segments.

3. The method of claim 2, wherein a weight between nodes in each similarity graph is determined according to a distance metric that compares pairs of the respective measurements.

4. The method of claim 2, wherein a structure of the similarity graph is determined as a k-nearest neighbor graph that preserves a geometry structure of an original data distribution.

5. The method of claim 1, further comprising determining the spectral embedding of each of the plurality of similarity graphs, including a power iteration embedding of the similarity graph as a one-dimensional vector.

6. The method of claim 1, wherein selecting the subset includes ranking the plurality of sensors includes determining a score for each sensor, based on a respective spectral embedding vector for the sensor and an entropy.

7. The method of claim 6, wherein determining the score includes calculating:

$$\text{score}(v^t, y) = \frac{I(v^t, y)}{\sqrt{H(v^t)H(y)}}$$

where $I(\bullet)$ is a mutual information function, $H(\bullet)$ is an entropy function, $v^t$ is the spectral embedding vector, and y is a label vector.

8. The method of claim 1, wherein selecting the subset includes minimizing a degree of redundancy between the plurality of sensors.

9. The method of claim 8, wherein minimizing the degree of redundancy includes minimizing an objective function using a coordinate descent.

10. The method of claim 1, wherein performing the corrective action includes an action selected from the group consisting of changing a security setting for an application or hardware component, changing an operational parameter of an application or hardware component, halting an application, restarting an application, halting a hardware component, rebooting a hardware component, changing an environmental condition, and changing a network interface's status.

11. A system for detecting and correcting anomalies, comprising:
    a hardware processor; and
    a memory, configured to store a computer program that, when executed by the hardware processor, implements:
        anomaly detection code that detects an anomaly in a cyber-physical system, based on a classification of time series information from a plurality of sensors that monitor the cyber-physical system as being anomalous;

sensor selection code that determines a similarity graph for each of the plurality of sensors, based on the time series information and selects a subset of the plurality of sensors that are related to the classification, based on a spectral embedding of the similarity graphs; and a controller that performs a corrective action responsive to the detected anomaly, prioritized according to the selected subset.

12. The system of claim 11, wherein each similarity graph includes a set of nodes that represent measurements from a respective sensor at different time segments.

13. The system of claim 12, wherein the sensor selection code determines a weight between nodes in each similarity graph according to a distance metric that compares pairs of the respective measurements.

14. The system of claim 12, the sensor selection code determines a structure of the similarity graph as a k-nearest neighbor graph that preserves a geometry structure of an original data distribution.

15. The system of claim 11, wherein the sensor selection code further determines the spectral embedding of each of the plurality of similarity graphs, including a power iteration embedding of the similarity graph as a one-dimensional vector.

16. The system of claim 11, wherein the sensor selection code further determines a score for each sensor, based on a respective spectral embedding vector for the sensor and an entropy.

17. The system of claim 16, wherein the sensor selection code calculates a score as:

$$\text{score}(v^t, y) = \frac{I(v^t, y)}{\sqrt{H(v^t)H(y)}}$$

where $I(\cdot)$ is a mutual information function, $H(\cdot)$ is an entropy function, $v^t$ is the spectral embedding vector, and y is a label vector.

18. The system of claim 11, wherein the sensor selection code minimizes a degree of redundancy between the plurality of sensors.

19. The system of claim 18, wherein the sensor selection code minimizes an objective function using a coordinate descent.

20. The system of claim 11, wherein the controller performs a corrective action selected from the group consisting of changing a security setting for an application or hardware component, changing an operational parameter of an application or hardware component, halting an application, restarting an application, halting a hardware component, rebooting a hardware component, changing an environmental condition, and changing a network interface's status.

* * * * *